May 9, 1933.  W. F. MACDONALD  1,907,844
AIR VALVE FOR RADIATORS
Filed Jan. 4, 1930
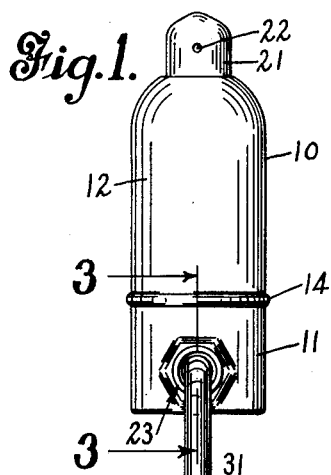
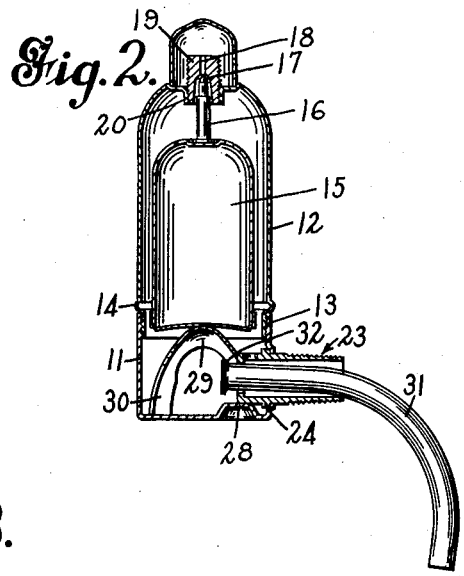
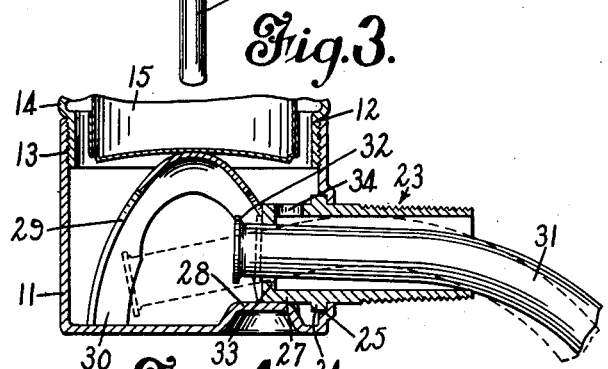
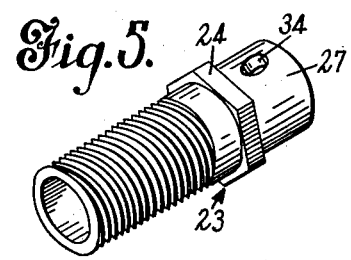
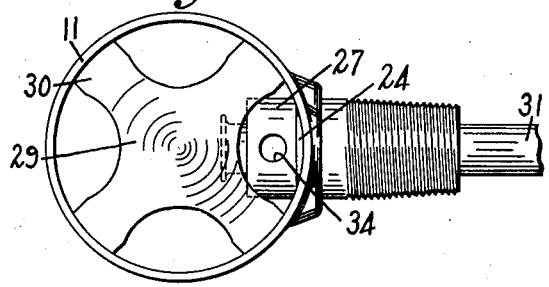
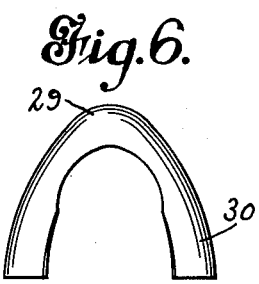
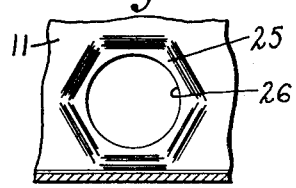
Inventor
William F. Macdonald
By Rohwer & Bartholow
Attorneys Patented May 9, 1933

1,907,844

UNITED STATES PATENT OFFICE

WILLIAM F. MACDONALD, OF BRIDGEPORT, CONNECTICUT, ASSIGNOR TO BRIDGEPORT BRASS COMPANY, OF BRIDGEPORT, CONNECTICUT

AIR VALVE FOR RADIATORS

Application filed January 4, 1930. Serial No. 418,521.

This invention relates to air valves such as used on steam radiators, the object of the invention being to furnish an air valve of strong and rugged construction which gives good service and which is, nevertheless, quite inexpensive.

Other objects of the invention are to provide improved means for fastening to the shell of the device the nipple which is to be screwed into the radiator, and for securing the nipple and other parts against dislocation incident to the use of the device; to provide means for effectively draining the shell of water; to furnish float supporting means of such structure that the steam coming into the shell has effective access to the float; and to improve generally the structure and operation of devices of this class.

To these and other ends the invention consists in the novel features and combinations of parts to be hereinafter described and claimed.

In the accompanying drawing,

Figure 1 is an elevation of an air valve embodying my improvements;

Fig. 2 is a vertical central section thereof;

Fig. 3 is an enlarged section on line 3—3 of Fig. 1;

Fig. 4 is a plan view of certain parts in the lower end of the shell or casing;

Fig. 5 is a detail view of the nipple;

Fig. 6 is a detail view of the float support; and

Fig. 7 is a fragmentary inside view of the shell showing the opening for receiving the nipple.

I have shown my improvements applied to an air valve device in which the shell 10 is of the ordinary generally cylindrical shape. This shell comprises a lower section 11 closed at the bottom and an upper section 12, joined together by a threaded joint 13. In the preferred form the lower section 11 has interior screw threads at its mouth and the upper section 12 has exterior screw threads near its lower end which engage the first-named threads, and above the threads on the upper section is a bead 14 spun therein which serves as a stop collar.

Within the shell is the usual hollow float 15 of metal carrying at its upper end a valve stem 16 upon the end of which is a needle valve 17 adapted to cooperate with an air passage 18 to close or open the same. The passage 18 is formed in a movable valve seat member 19, which in the form shown has exterior screw threads engaging interior screw threads formed on a depending integral flange 20 at the upper part of the casing, as shown in Fig. 2. By means of the screw threads the position of the seat for the valve 17 may be adjusted vertically, as will be obvious. The valve seat member 19 is enclosed by a sheet metal cap member 21 having a side opening 22 by means of which the air passage 18 above referred to is placed in communication with the atmosphere.

My air valve device is, as usual, provided with a threaded nipple part adapted to be screwed into a threaded opening in the radiator, through which nipple part extends, as customary, a drain tube for draining off water collecting in the lower part of the air valve casing. In this case, however, the nipple member, which is indicated in general by reference character 23, is secured in place in the shell section 11 by novel means such that the connection between the nipple and shell is very strong and resists very effectively the bending and twisting strains to which the device is subjected, while at the same time the construction is simple and inexpensive. For these purposes it is preferred to provide the nipple intermediate of its ends with a laterally projecting collar of polygonal form which enters and is seated in a correspondingly formed recess in the wall of the shell, in which recess the collar is soldered and effectively held against rotation when the device is screwed into and out of place in the radiator. It is preferred to form on the nipple 23 intermediate of its ends an exteriorly projecting hexagonal collar 24 which is disposed at the inner face of the shell when the nipple is assembled in the shell, and to form at the inner face of the shell a depression 25 of hexagonal shape around the opening 26 for receiving the nipple, the depression 25 being of such size as to conform closely to the collar 24 and prevent rotation thereof.

After assemblage the collar 24 is soldered in the seat 25.

It will be observed that the nipple extends inwardly in the shell to some distance beyond the inner face of the shell side wall. The inwardly projecting portion of the nipple is shown at 27. This inwardly extending portion of the nipple is firmly seated and supported upon a bump or boss 28 projecting upward from the floor or bottom of the section 11. The bump may be advantageously provided by depression of the sheet metal in the lower flat wall of section 11. This bump or boss provides in effect an abutment supporting the inner end of the nipple against downward displacement in order to resist effectively any strains set up by pressure on the outer part of the nipple in an upward direction.

The support for the float 15 is shown at 29. This part, which is preferably made of thin sheet metal, is made generally in the shape of a cone and it has a relatively sharp or peaked upper end to contact with and support the float 15 in such a manner that steam entering the casing may have full and complete access to the bottom surface of the float as well as to the side wall thereof, for the purpose of expanding the float and moving the valve 17 to its closed position when steam enters the radiator. By having the upper end of the float support come to a relatively sharp point, as shown, the area of contact between the float support and the float is relatively small so that the steam has access to practically the entire lower surface of the float and thus the device is made more sensitive and the float will expand more quickly after the entrance of steam in order to shut the valve at the top of the device and prevent the egress of steam or water.

It will be observed that the float supporting member 29 is cut away at the lower part to form supporting legs 30 and thus the passage of steam from the inner end of the nipple to the bottom of the float is facilitated. It will be observed further that these legs 30 of the float support are firmly secured to the bottom or floor of the lower section as by soldering them thereto, and that the inner extension of the nipple, previously referred to, is disposed between two of these legs in firm engagement therewith. In this manner lateral strains on the exteriorly projecting part of the nipple in a direction toward one side or the other are effectively resisted and this disposition of the parts increases the strength of a construction in which considerable strength is already present, owing to the manner of securing the nipple in place by the polygonal collar and the reenforcing bump 28.

The drain tube 31 of the usual type passes inwardly through the nipple 23 and has a flange 32 at its inner end which overlies the mouth at the inner end of the nipple so as to prevent the drain tube from falling out of place. The drain tube passes through the nipple with a certain amount of clearance, even at the inner end or mouth 33 of the nipple, which is of less diameter than the remainder of the nipple bore. When the drain tube is in the position shown in Fig. 2, water accumulating in the casing can pass out between the side wall of the drain tube and the side surface of the nipple mouth. However, even when the drain tube happens to be so located that its flange is in immediate contact with the inner nipple mouth, drainage of the casing of the device is provided for in an effective manner owing to the fact that the inner end or extension of the nipple is provided for that purpose with suitable means for carrying off the collected water. In the form shown the inner end portion 27 of the nipple is provided at its upper part with a drain port 34 for this purpose, and it will be obvious that any water rising above the top of the nipple will be drained off through the passage or port 34 into the nipple interior and thus into the radiator. It will be readily apparent that steam can readily pass inward through the nipple around the drain tube and this movement of the steam will ordinarily hold the drain tube in the position shown in Fig. 2, but the drainage of the casing will be provided for even should the flange on the lower end of the drain tube become stuck against the mouth of the nipple. This position of the drain tube is indicated by one set of dotted lines in Fig. 3, while other dotted lines in that figure show the innermost position of the drain tube, which cannot be moved inwardly into a position in which the inner end thereof will be shut off.

In assembling the device the float 15 is interposed between the sections 11 and 12 and these two sections screwed together while the valve seat member 19 is in position in the upper end of section 12, but before the cap member 21 has been placed in position. After the two sections have been screwed together as far as permitted by the stop bead 14, the valve seat member 19 is adjusted to give the required amount of clearance between said member and the needle valve when the float is supported on the float support. The cap 21 is then placed over the member 19 and soldered in its seat on the upper end of the casing.

Nipples such as used in making my improved air valves can be readily manufactured on automatic screw machines and in general the parts of my device are simple, cheap, and easy to assemble, while at the same time the structure provided is sturdy and effective.

Various changes may be made in the details of construction without departure from the invention as defined in the claims.

What I claim is:

1. In an air valve for radiators, the combination of a shell having an opening in its side wall and a depression in said wall around said opening, the outer boundary of said depression presenting a plurality of recesses, a nipple passing through said opening and having a laterally outstanding collar whose periphery presents a plurality of corners non-rotatably engaged in said recesses to thereby lock said nipple against rotation independently of the shell.

2. In an air valve for radiators, the combination of a shell having an opening in its side wall and a polygonal depression in said wall around said opening, a nipple passing through said opening and having intermediate its ends a polygonal outstanding collar conforming to said depression and thereby locked against rotation independently of the shell, said depression being located at the inner face of the shell wall.

3. In an air valve for radiators, a shell having an opening in its side wall, a nipple passing through said opening and projecting at its inner end to a substantial extent within the shell and having its inner end spaced upwardly from the floor of the shell, and means for firmly securing the nipple in place, including an upwardly directed abutment on the floor of the shell engaged with the inner extremity of the nipple.

4. In an air valve for radiators, a sheet metal shell having an opening in its side wall, a nipple passing through said opening and projecting at its inner end to a substantial extent within the shell, and means for firmly securing the nipple in place, including an upstanding abutment engaged with the inner extremity of the nipple, said abutment formed by upward displacement of the metal in the floor of the shell.

5. In an air valve for radiators, a sheet metal shell having an opening in its side wall and a polygonal depression in said side wall around said opening, on the inner face of said side wall, a nipple secured in said opening having an exterior laterally projecting polygonal collar engaging and conforming to said depression so as to be held against rotation, said nipple extending to a substantial degree within the interior of said shell, means associated with the inner end of said nipple to support it from the shell, a drain tube passing through said nipple, a float support adjacent the inner end of the nipple, a float engaging said float support, and an air valve actuated by said float.

6. In an air valve for radiators, a shell having an opening in its side wall, a nipple secured in and extending through said opening, said shell having at its bottom, below the nipple, a flat floor, a drain tube extending through said nipple, a float support substantially conical in form constituted by a cupped member cut away peripherally to form legs which are secured to the floor of the shell, an upwardly directed abutment on said floor supporting the inner end of the nipple from beneath, a float having a bottom supported on the tip of said float support, and an air valve actuated by the float.

7. In an air valve for radiators, a shell having an opening in its side wall, a nipple secured in and extending through said opening, a drain tube extending through said nipple, a float support substantially conical in form and having legs secured to the floor of the shell, a float supported on said float support, and an air valve actuated by the float, said float support having downwardly diverging legs between which the inner end of said nipple extends.

8. In an air valve for radiators, a shell having an opening in its side wall, a nipple secured in and extending through said opening, a drain tube extending through said nipple, a float support substantially conical in form and having legs secured to the floor of the shell, a float supported on said float support, an air valve actuated by the float, said float support engaging the inner end of said nipple at opposite sides thereof to maintain it against twisting strains, and means for supporting the inner end of said nipple from the floor of the shell.

9. In an air valve for radiators, a two-part casing, a valve seat associated with the upper part of the casing, a float in the upper part of the casing having a valve to cooperate with said valve seat, a nipple communicating with the lower part of the casing, a drain tube extending through said nipple, and a support for said float located in the lower part of the casing, said float having a flat bottom, and said float support having a pointed upper end portion engaging the bottom of said float over a relatively small area thereof, said float support being cut away at its lower part and resting on the floor of the lower part of the casing and straddling said nipple for holding it against dislocation.

10. In air valve for radiators, the combination with a sheet metal shell having an opening in its side wall and a depression in said wall surrounding said opening, said depression having a non-circular peripheral wall, of a nipple passing through said opening and having intermediate its ends a shoulder projecting outwardly from its outer surface and engaged in said depression and having a peripheral portion conforming to the periphery of said depression so that the shoulder and nipple are locked against rotation in said opening, and means for securing the nipple in said opening.

11. In an air valve for radiators, the combination with a shell having an opening in its side wall and a depression in said wall around said opening having a non-circular peripheral portion, of a nipple passing through said opening and having a laterally outstanding collar concentric to said nipple having peripheral projections located in said peripheral portion to thereby lock the nipple against rotational displacement in said opening.

12. In an air valve for radiators, the combination with a shell having an opening in its side wall and a depression in said wall around said opening having a non-circular portion therein, of a nipple passing through said opening and having a laterally outstanding collar conforming in shape to the non-circular portion of said depression and located therein to thereby lock the nipple against rotational displacement in said opening, the inner end of said nipple being extended to a substantial extent within the interior of the shell, and an upstanding abutment on the floor of the shell engaging the inner extremity of the nipple from beneath.

13. In an air valve for radiators, a shell having an opening in its side wall, a nipple extending through said opening from the exterior of the shell to the interior thereof, a drain tube extending through the nipple, a float support associated with the floor of the shell, a float supported on said float support, and an air valve actuated by the float, said float support engaging the inner end of said nipple to resist dislocation thereof.

14. In an air valve for radiators, a shell having an opening in its side wall, a nipple having a part located exteriorly of the shell and a part extending through said opening into the interior of the shell, a float support having legs rigidly secured to the floor of the shell, said nipple being rigidly held in place between said legs, a float supported on said float support, and an air valve actuated by the float.

15. In an air valve for radiators, a shell having an opening in its side wall, a nipple located partly exteriorly of the shell and partly interiorly thereof and extending through said opening, means associated with said opening acting as an interlock to prevent rotation of said nipple on its axis within said opening, a float support associated with the floor of said shell having engagement with the inner end portion of said nipple to resist the dislocation thereof to one side or the other, means associated with the floor of the shell for resisting dislocation of the nipple in a downward direction, a float supported on said float support, and an air valve actuated by said float.

In witness whereof I have hereunto set my hand this 31st day of December, 1929.

WILLIAM F. MACDONALD.